(12) United States Patent
Orcutt

(10) Patent No.: US 7,391,553 B2
(45) Date of Patent: Jun. 24, 2008

(54) LOW COST TORSIONAL HINGE MIRROR PACKAGE WITH NON-ROTATING MAGNETIC DRIVE

(75) Inventor: John W. Orcutt, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/003,245

(22) Filed: Dec. 3, 2004

(65) Prior Publication Data
US 2006/0119923 A1 Jun. 8, 2006

(51) Int. Cl.
G02B 26/00 (2006.01)
G02B 26/08 (2006.01)

(52) U.S. Cl. .......................... 359/291; 359/223

(58) Field of Classification Search ......... 359/290–291, 359/223–224, 295
See application file for complete search history.

(56) References Cited

U.S. PATENT DOCUMENTS

| | | | | |
|---|---|---|---|---|
| 5,202,785 A | * | 4/1993 | Nelson | 359/224 |
| 5,233,456 A | * | 8/1993 | Nelson | 359/224 |
| 6,731,420 B2 | * | 5/2004 | Orcutt et al. | 359/223 |
| 6,900,918 B2 | * | 5/2005 | Orcutt et al. | 359/224 |
| 7,190,502 B2 | * | 3/2007 | Filhol | 359/224 |
| 2004/0027449 A1 | * | 2/2004 | Turner et al. | 347/243 |

* cited by examiner

Primary Examiner—Scott J. Sugarman
Assistant Examiner—Dawayne A Pinkney
(74) Attorney, Agent, or Firm—William B. Kempler; W. James Brady, III; Frederick J. Telecky, Jr.

(57) ABSTRACT

A torsional hinge structure for supporting a functional surface such as a mirror is disclosed. The structure includes at least one torsional hinge extending between a functional surface such as for example, a mirror and an anchor pad such that the torsional or the functional surface can pivot around the torsional hinge. The device may comprise two torsional hinges or a single torsional hinge. However, the single torsional hinge or one of the dual torsional hinges will be elongated and include a permanent magnet mounting area to which is bonded a permanent magnet. The structure defines a bobbin area or portion underneath the enlarged area for mounting the drive magnet. A conductor is wound around the drive bobbin for forming an electromagnet, which generates magnetic forces that interact with the permanent magnet mounted on the torsional hinge to cause pivoting motion of the mirror or other functional device.

25 Claims, 8 Drawing Sheets

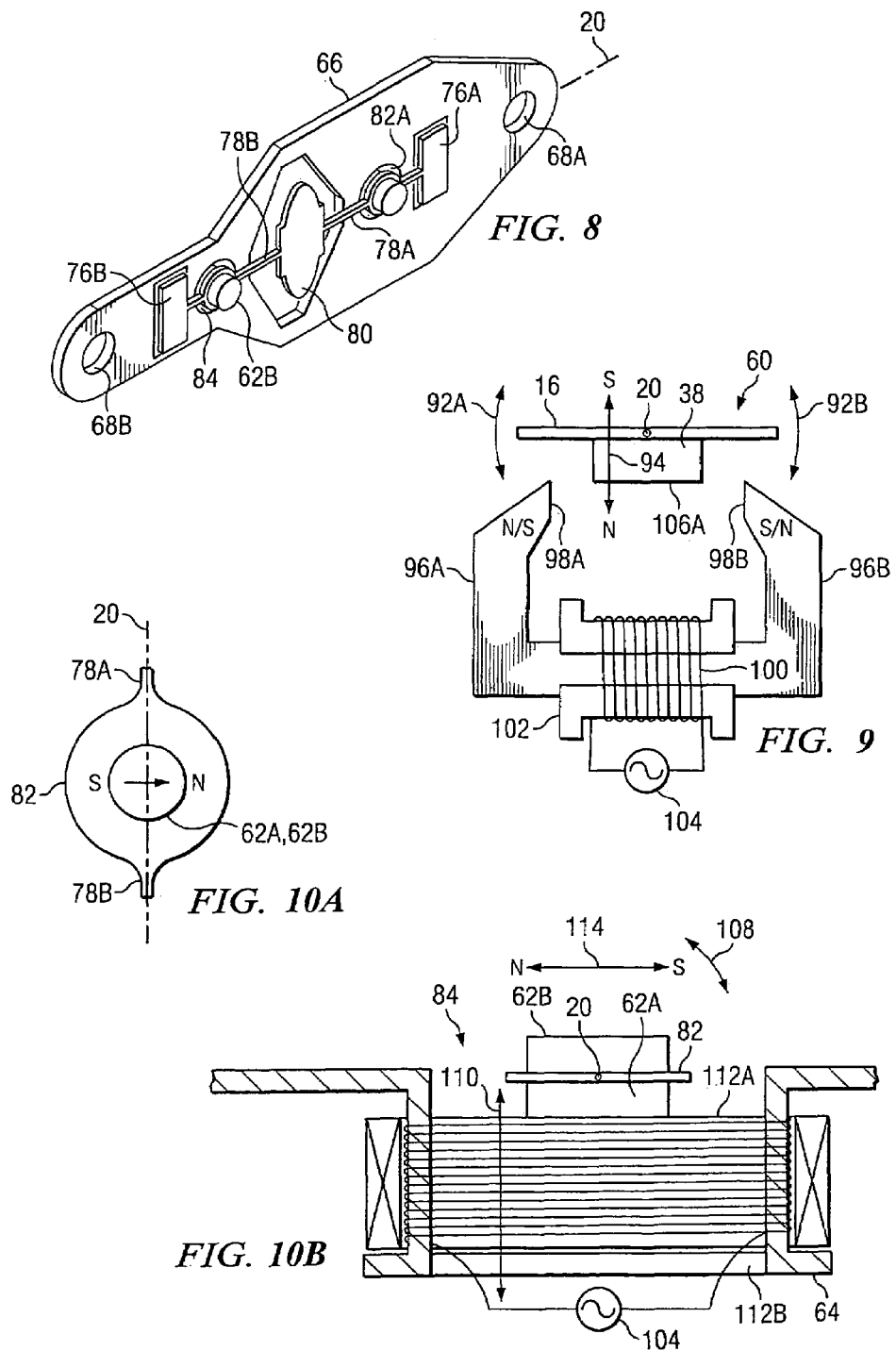

LOW COST TORSIONAL HINGE MIRROR PACKAGE WITH NON-ROTATING MAGNETIC DRIVE

TECHNICAL FIELD

The present invention relates generally to the field of torsional hinge MEMS oscillating devices. More particularly, the invention relates to methods and apparatus for providing an inexpensive combination of a pivoting mirror with a magnetic drive mechanism and support package wherein the mass balance of the magnet and other rotating elements of the mirror require less critical tolerances. This reduces costs.

BACKGROUND

The use of rotating polygon scanning mirrors in laser printers to provide a beam sweep or scan of the image of a modulated light source across a photoresistive medium such as a rotating drum is well known. More recently, there have been efforts to use a much less expensive flat mirror with a single reflective surface such as a mirror oscillating in resonance to provide the scanning beam. These scanning mirrors provide excellent performance at a very advantageous cost. However, because the permanent drive magnet is mounted on the resonant mirror itself, the mass balance of the magnet and other rotating elements have very close and critical tolerances. Robust mounting brackets typically have been used to mount the torsional hinge mirrors to a using device to help assure a stable platform. However, distortion of the bracket itself due to mounting stresses and/or different CTE (coefficient of thermal expansion) between a mirror and the bracket can also produce sufficient stress in the mirror bracket that will cause the resonant frequency of the scanning mirror to change beyond acceptable limits or even destroy the mirror.

Texas Instruments presently manufactures mirror MEMS devices fabricated out of a single piece of material (such as silicon, for example) typically having a thickness of about 100 to 115 microns using semiconductor manufacturing processes. The reflective surface of the mirror may have any suitable perimeter shape such as oval, elongated elliptical, rectangular, square or other. Single axis mirrors include the reflective surface portion and a pair of torsional or full hinges, which extend to a support frame or alternately the hinges may extend from the mirror portion itself to a pair of hinge anchors. Other mirror embodiments use a single torsional hinge to eliminate hinge stress.

U.S. Patent Application No. 2004/0027449 describes various techniques for creating the pivotal resonance of the mirror device about the torsional hinges. Thus, by designing the mirror hinges to resonate at a selected frequency, a scanning engine can be produced that provides a scanning beam sweep with only a small amount of energy required to maintain resonance.

In addition, the mass balance of the mirror further complicates the task of mounting the resonant frequency within acceptable tolerances. Magnetic drive mechanisms for the mirror typically depend on a permanent magnet mounted to the resonating mirror surface interacting with a drive coil located very close to the mirror. The critical mass balance of the mirror requires that the permanent magnet be designed with a size, thickness and mass having very close tolerances.

Therefore, since applications that use a pattern of light beam scans, such as laser printers and imaging projectors, as well as other uses, require a stable precise drive to maintain a constant scan velocity, the changes in the resonant frequency and scan velocity of a pivotally oscillating device due to temperature variations, careless placement of the magnet on the mirror or out of tolerance size and/or mass, can restrict or even preclude the use of the device in laser printers.

Therefore, it would be advantageous to provide an inexpensive and easily manufactured mirror package that does not require extremely close tolerance as to mounting position.

SUMMARY OF THE INVENTION

These and other problems are generally solved or circumvented, and technical advantages are generally achieved, by embodiments of the present invention, which provide a pivoting mirror package. The mirror package comprises a unitary mirror support structure having a mirror side and a bottom side, a drive coil and a pivoting functional surface or mirror device such as a scanning mirror. The unitary mirror support structure defines a mounting portion adapted for attaching the unitary mirror support structure to a using device such as for example, a laser printer. The support structure further includes a mirror portion for supporting the pivoting mirror device and a bobbin portion formed on the bottom side of the structure for supporting the coils that interact with a permanent magnet associated with the mirror device. The mirror device itself comprises an anchor for attaching to the mirror side of the unitary mirror support structure, a mirror member for reflecting light, and a first torsional hinge extending along a selected axis between the anchor and the mirror member for pivotally supporting the mirror member about a selected axis. The first torsional hinge further defines at least one enlarged area located between the anchor member and the mirror member and above the bobbin portion of the support structure. A permanent magnet is attached to the enlarged area defined on the first torsional hinge. There is also provided a coil comprising a multiplicity of electrical windings supported by the bobbin portion such that an electric current through the multiplicity of windings will create a magnetic force that cooperates with the permanent magnet to pivot the mirror member about the first torsional hinge. The anchor associated with the mirror device may be a frame or alternately may be attaching pads. According to one embodiment, the pivoting mirror package comprises a second torsional hinge extending away from the first torsional hinge and along the selected axis from the mirror member to the anchor, and according to one variation of this embodiment, a second enlarged area is formed on the second torsional hinge between the mirror member and the anchor. A second permanent magnet is attached to the second enlarged area, and there is also included a second bobbin portion to support another set of electrical windings for a second electromagnetic coil.

According to another embodiment, the second torsional hinge is not included but the mirror member does include an axial member having one end attached to the mirror member and a free end. The free end extends away from the mirror member along the selected axis and cooperates with an axial support for constraining movement of the axial member in a plane that is perpendicular to the selected axis while allowing the free end of the axial member to rotate around the axis. The axial support may comprise a raised portion or hub attached to the unitary mirror support or alternately may simply define an aperture in the unitary mirror support for receiving the free end of the axial member.

According to another embodiment, the pivoting mirror may be a layer of single crystalline silicon. Alternately, the mirror device may be formed of multilayers comprising a mirror layer, a hinge layer, and a backside layer. The hinge layer includes the torsional hinge, the enlarged area on the torsional hinge, and an attaching area having a front side for attaching the reflecting layer of the device and a backside. The mirror layer may further include a spacer portion located behind the reflecting portion and attached to the front side of the hinge layer. The balancing layer is attached to the backside of the hinge layer to help balance the mass of the mirror device and the permanent magnet on the pivoting axis.

The mirror member may oscillate at any selected frequency, but preferably is designed to oscillate at the resonant frequency of the device. The magnet attached to the enlarged area of the torsional hinge may either be orientated perpendicular to the plane of the mirror or may lie parallel to the plane of the mirror but perpendicular to the pivoting axis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 8 is a top perspective view of another embodiment of this invention illustrating a full hinge mirror with a two-magnet drive mechanism;

FIG. 9 is a cross-sectional view showing a magnetic drive mechanism for a mirror combination having a permanent magnet attached with an axial or pole orientation perpendicular to the plane of the mirror surface;

FIG. 10A is a view of a diametrical permanent magnet mounted on the hinge of a drive of the type shown in FIGS. 5A, 5B, 6A, 6B, 7A and 7B; and FIG. 10B is a cross-sectional view of the drive mechanism for the diametrically orientated permanent magnet of FIG. 101A.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
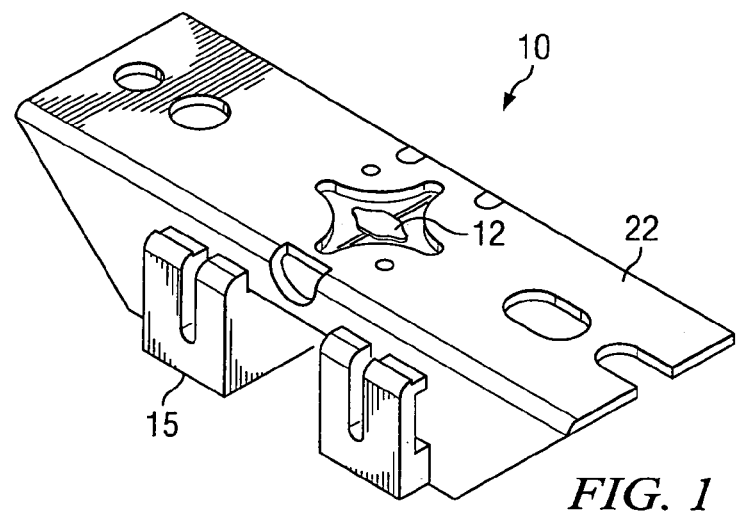
FIG. 1 illustrates a currently available combination support bracket, driving mechanism and torsional hinge mirror.

Referring now to FIG. 1, there is shown a presently available mirror package using torsional hinged mirrors. As shown, the combination package includes a support bracket 10, pivoting torsional hinged mirror device 12 and a drive mechanism (mostly obscured) 15.

Figure 2A:
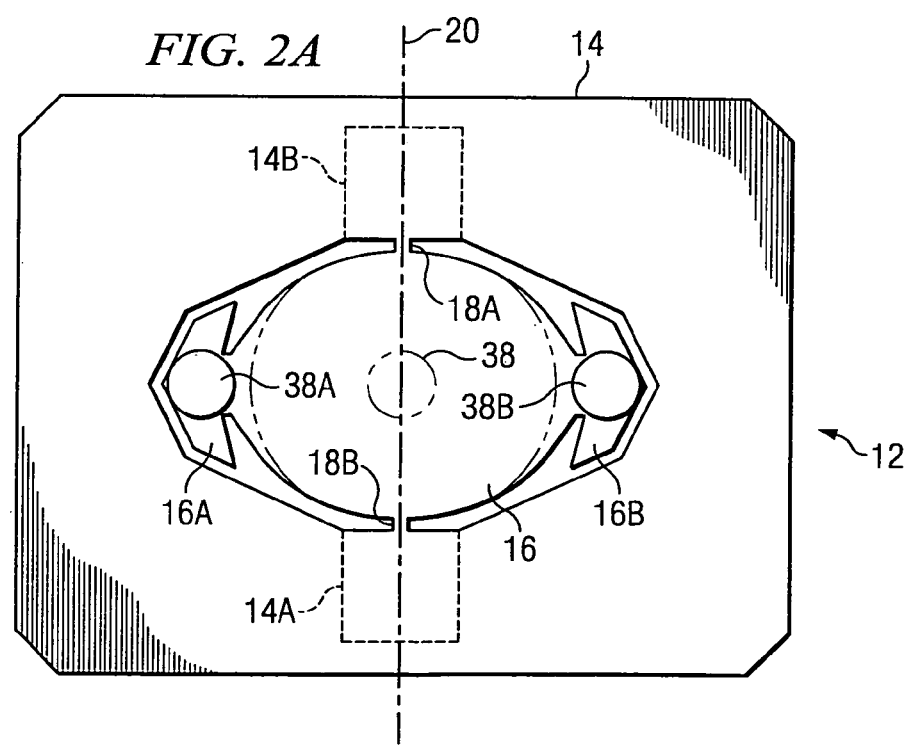
FIGS. 2A and 2B illustrate two embodiments of a full hinge or two-torsional hinged mirror.
Figure 2B:
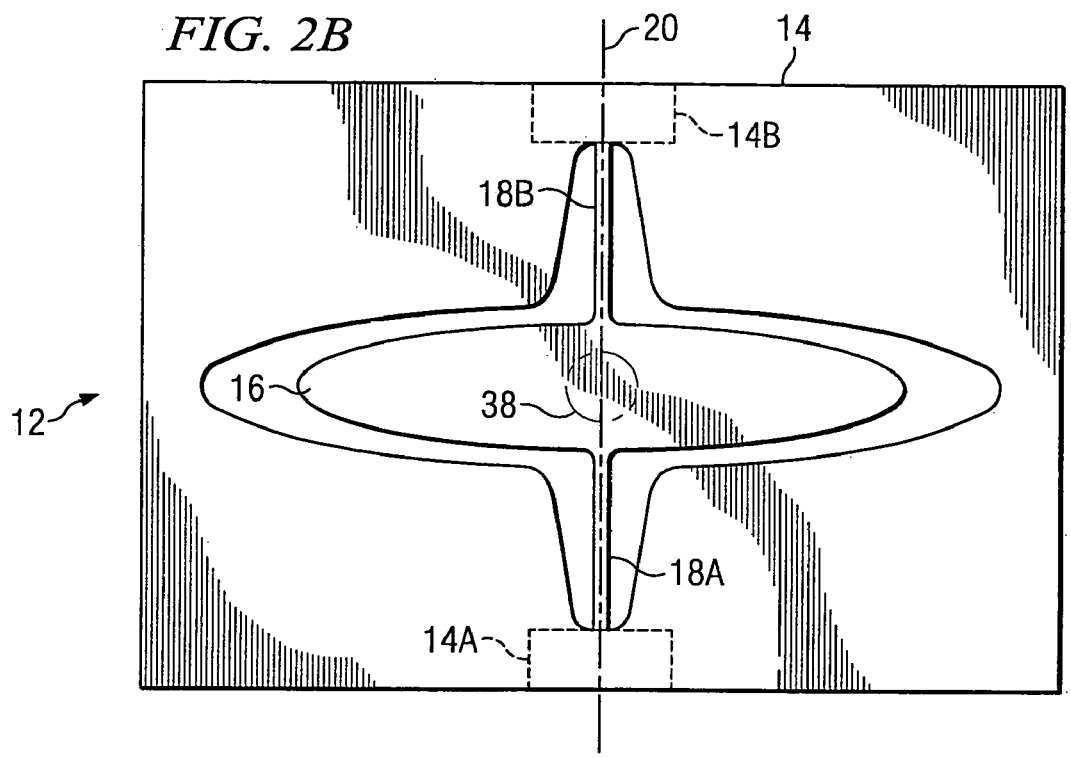

Various embodiments of torsional hinged mirrors may be used with the combination package illustrated in FIG. 1. However, FIGS. 2A and 2B illustrate examples of torsional hinged mirrors suitable for a using device such as a laser printer. As shown in each of the embodiments, the mirror device 12 will include an anchor such as frame 14 and a surface for reflecting light such as mirror member 16. Mirror member or reflecting surface 16 is supported by a pair of torsional hinges 18a and 18b extending from the mirror to the anchor 14. In the embodiments of FIGS. 2A and 2B, the anchor is frame 14. However, it will be appreciated that instead of a complete frame around mirror member 16, the anchor 14 may simply include a pair of anchor pads 14a and 14b. Thus, a drive mechanism applies forces to the mirror member 16, so that the mirror member 16 will pivot or oscillate (preferably at a resonant frequency) about the torsional hinges 18a and 18b. The pivot axis or selected axis 20 lies along the torsional hinges 18a and 18b. Typically, the drive mechanism is a permanent magnet bonded to the mirror that interacts with a magnetic force created by coils or windings. The embodiment of FIG. 2A illustrates two embodiments for attaching the permanent magnet. The pivoting mirror portion 16 may include two tabs 16a and 16b, which support two magnets 38a and 38b. Alternately, the tabs may be eliminated as indicated by the dashed lines and a single magnet 38 is bonded to the center of the mirror or reflecting surface 16.

In the embodiment shown, the frame member 14 or the anchor pads 14a and 14b are mounted to the under surface of plate 22 of support bracket 10 of FIG. 1. In the illustrative embodiments, the mirror device 12 is formed from a single slice of silicon. However, it will be appreciated that the mirror device 12 could also be a multilayered structure having a mirror layer and a hinge layer, such as illustrated in FIG. 4B to be discussed hereinafter. A spacer layer may also be included to help center the mass moment of the mirror device 12 on the pivot axis.

Figure 3A:
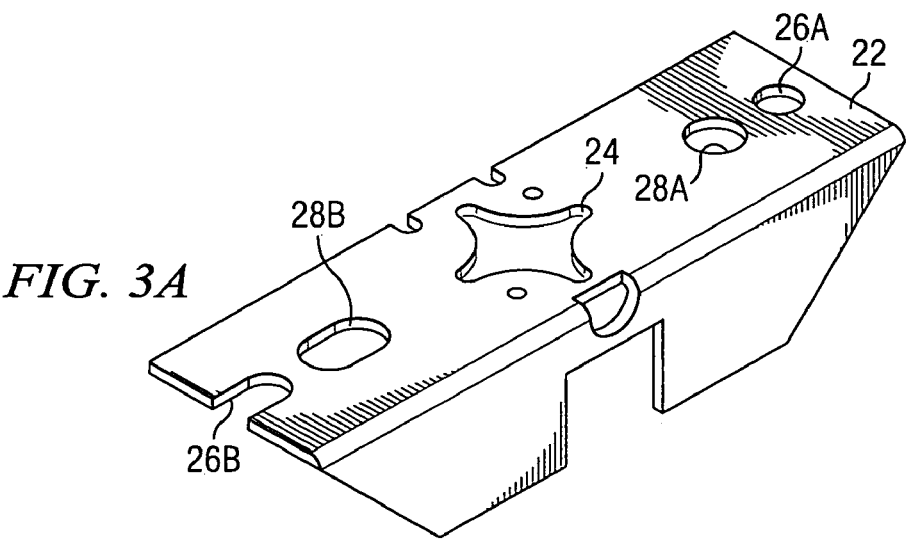
FIGS. 3A, 3B and 3C illustrate the support bracket and drive mechanism of the combination structure of FIG. 1.

Referring to FIG. 3A, there is an alternate view (mirror image) of the support bracket shown in FIG. 1 unencumbered by the drive mechanism or the mirror. As illustrated, the support bracket includes a first mirror attaching aperture 24 at which the mirror is attached, a pair of locating or alignment apertures 26a and 26b, which received locator pins (not shown), and a pair of apertures 28a and 28b, which receive bolts for mounting the structure to a using device.

Figure 3B:
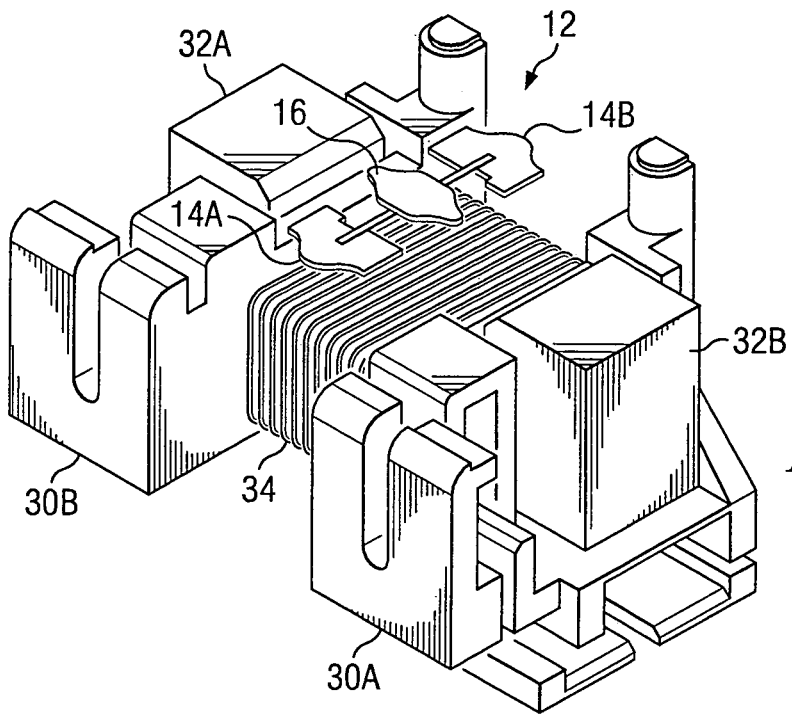

Referring to FIG. 3B, there is shown a drive mechanism with the mirror device 12 with reflecting surface or mirror 16 and anchor pads 14a and 14b illustrated in the location it would occupy if mounted to the bracket. The drive mechanism includes mounting portions 30a and 30b, core pieces 32a and 32b for pivoting the mirror or reflecting surface 16 of mirror device 12. The interaction of a permanent magnet mounted on mirror device 12 and the drive mechanism of FIG. 3B will be discussed hereinafter with respect to FIG. 9.

Figure 3C:
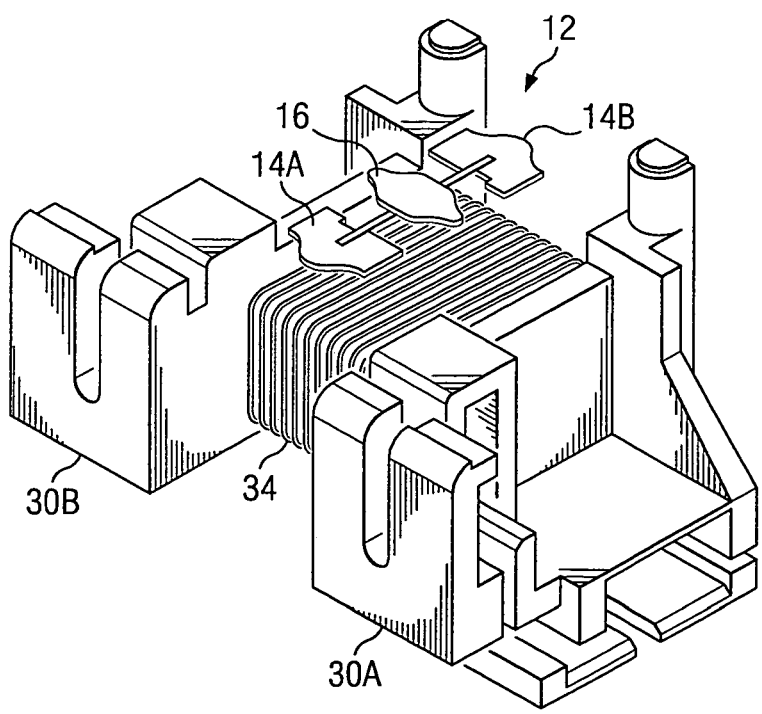

FIG. 3C is similar to the illustration of FIG. 3B except the core members 32a and 32b have been removed.

Figure 4A:
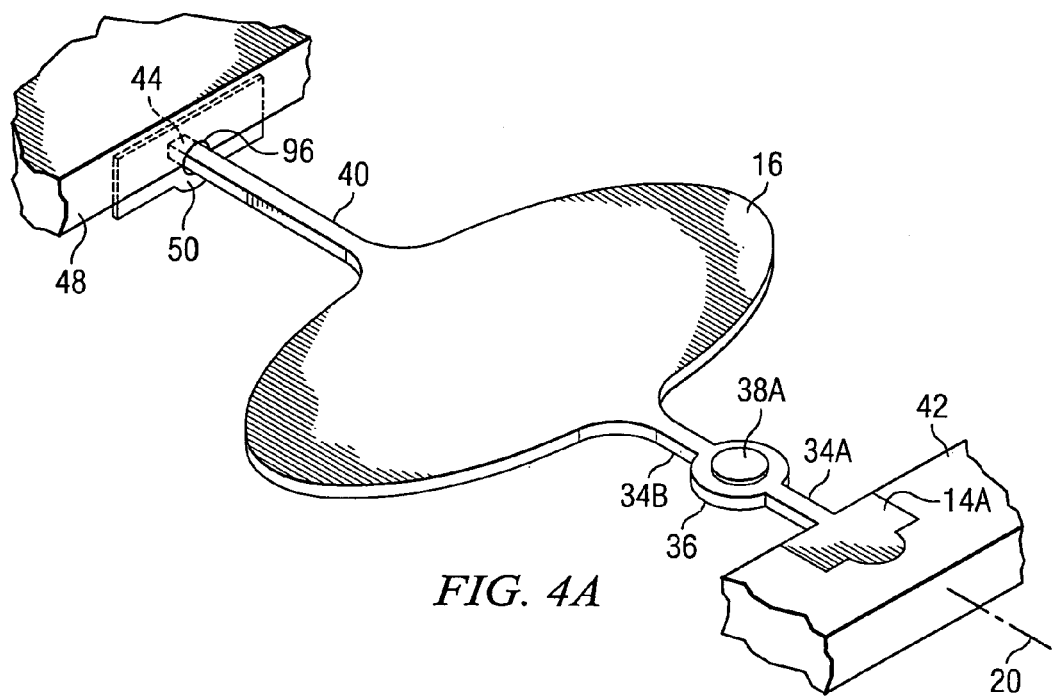
FIGS. 4A, 4B, and 4C are perspective views illustrating embodiments of a half or single-torsional hinged mirror structure.
Figure 4B:
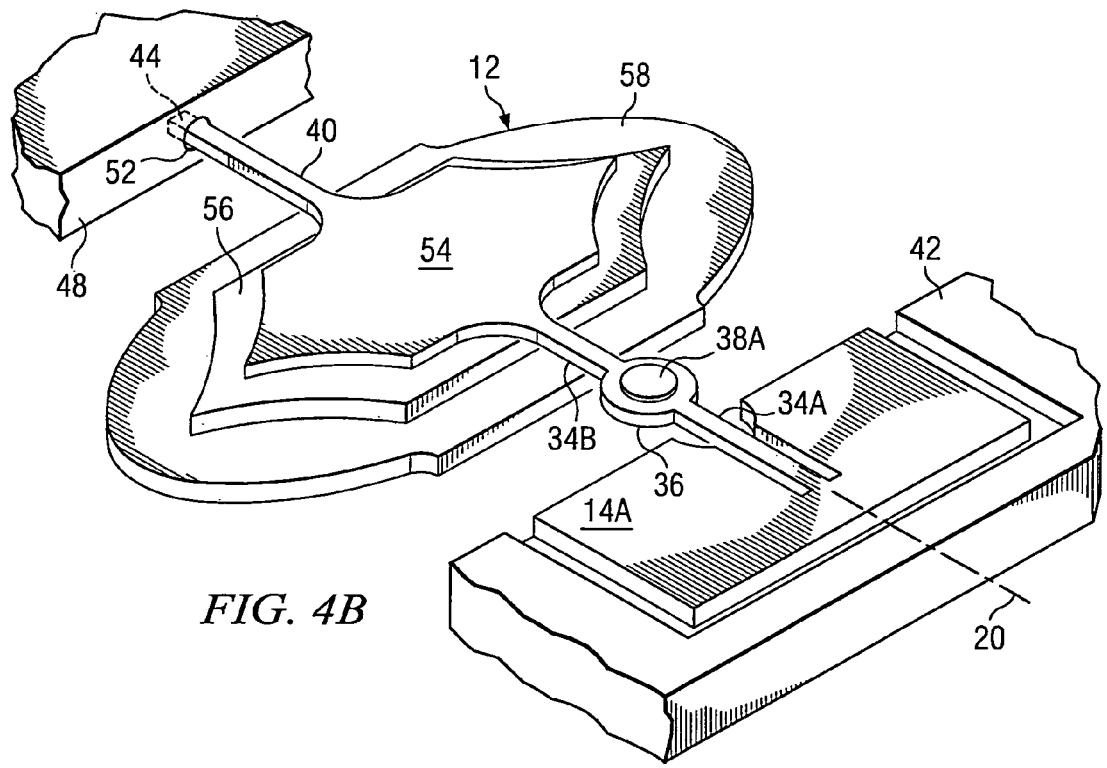
Figure 4C:
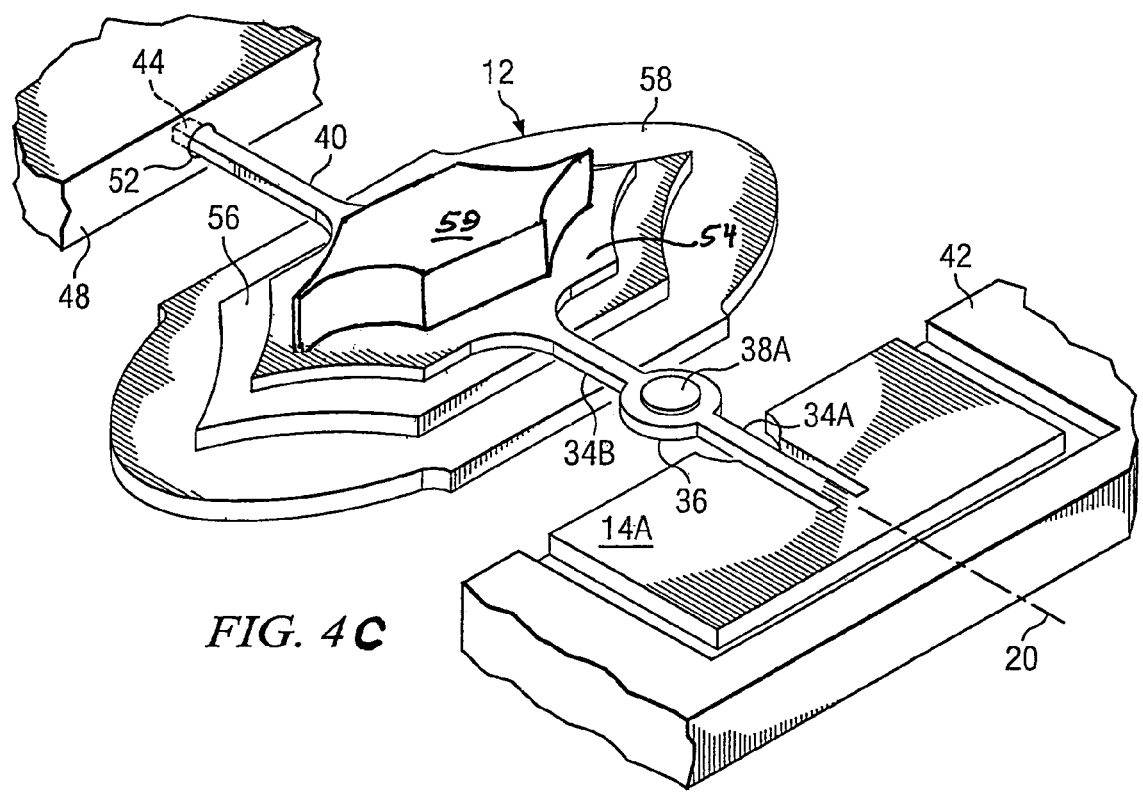

Referring now to FIGS. 4A, 4B, and 4C, there are shown examples of a single layer and a multilayered embodiments of single or half torsional hinge mirrors according to the teachings of the present invention. Those components and elements of the mirror of the invention as illustrated in FIGS. 4A, 4B, and 4C will carry the same reference numbers as the common elements in the previously discussed figures. As shown in FIG. 4A, there is an elongated ellipse mirror portion 16 supported by a single or half torsional hinge having a first portion 34a and a second portion 34b separated by an enlarged magnet attaching area 36. One end of the torsional hinge portion 34a is attached to an anchor member 14a. Also as shown, the structures of FIGS. 4A, 4B, and 4C include a permanent magnet for providing the forces that pivot the mirror. In the illustration of FIGS. 4A, 4B, and 4C, there is shown a single permanent magnet 38a. However, as should be appreciated and as will be discussed later, there may be a second permanent magnet 38b on the topside of enlarged area 36, or magnet 38a can be eliminated and only top magnet 38b used. It should also be noted that the mirror structure embodiment of FIGS. 4A, 4B, and 4C does not include a second torsional hinge, but instead includes an axial support member 40. However, axial support member 40 does not include an anchor pad and is not mounted to a support structure at its extreme end. Thus, as seen, the mirror structure of FIGS. 4A, 4B, and 4C will pivot around the pivot axis 20 on the single torsional hinge 34a-34b at a selected frequency, and preferably at the resonant frequency of the torsional mirror and hinge structure. A mirror structure without an axial support member 40 has been found to reach a resonant frequency and operate quite satisfactorily. However, as will be appreciated, because the mirror portion would be supported as a cantilever member solely by the torsional hinge, a mirror without a supporting axial member 40 is susceptible to forces in a plane perpendicular to the axis 40 of the mirror device that could damage or destroy the mirror. Consequently, referring again to FIGS. 4A, 4B, and 4C, and as was discussed above, the axial member 40 does not include another anchor pad or frame that attaches to a support structure but instead provides support to the mirror in a plane perpendicular to the axis as illustrated in FIGS. 4A, 4B, and 4C.

As shown in FIG. 4A, the anchor pad 14a will be attached to a supporting structure 42 and the extreme end 44 of the axial member may lay on top of another portion 48 of the support member, such as in groove 46, and then held in place via an axial hub or support member 50. Thus, the axial member 40 is free to rotate, but is substantially constrained from movement in a plane perpendicular to the selected axis 20. It will also be appreciated by those skilled in the art that, according to another embodiment, the axial support may simply comprise a hole or aperture 52 drilled into the support structure 48 for receiving the extreme end 44 of the axial member as shown is in FIG. 4B.

Referring to FIGS. 4B and 4C, there are shown a bottom view of mirror structure embodiments that are substantially similar to that shown with respect to FIG. 4A except the structure of mirror device 12 is multilayered. As shown in FIG. 4B, the mirror structure includes a hinge layer comprising an anchor pad 14a, a single torsional hinge 34a-34b, the enlarged area 36, the axial member 40, and an enlarged mirror attachment portion 54 as illustrated. The hinge layer also includes a backside and a mirror side and, as shown, a permanent magnet 38 is secured to the enlarged magnet attaching area 36 of the hinge layer. As discussed above, a single magnet 38b could be mounted on the mirror side or both permanent magnets 38a and 38b could be mounted on opposite sides of enlarged area 36. A spacer portion 56 having a selected thickness and mass may also be included. If included, the spacer portion 56 is secured to the mirror side of the enlarged attaching portion 54 of the hinge layer. There is also a mirror portion 58 that includes the reflecting surface and a backside, which is attached to a front side of the spacer portion. It should also be appreciated, that the spacer portion 56 and mirror portion 58 may comprise two separate layers of silicon bonded together or, according to another embodiment and as will be discussed hereinafter, two portions may be etched from a single piece of silicon. As was mentioned above, the extreme end 44 of the axial member is supported by an aperture 52 defined in support member 48. It will also be appreciated, of course, that the axial member 40 could be supported by a hub member, such as hub member 50, rather than aperture 52, as was discussed with respect to FIG. 4A. FIG. 4C is similar to FIG. 4B except there is also included a balancing layer 59 located on the back side of hinge layer 54. The balancing layer 59 is preferably selected to have a mass, weight and size such that the mass moment of the entire combined structure including the permanent magnet(s) 38a-38b will lie on the pivotal axis 20 that passes through the hinges of the hinge layer.

Figure 5A:
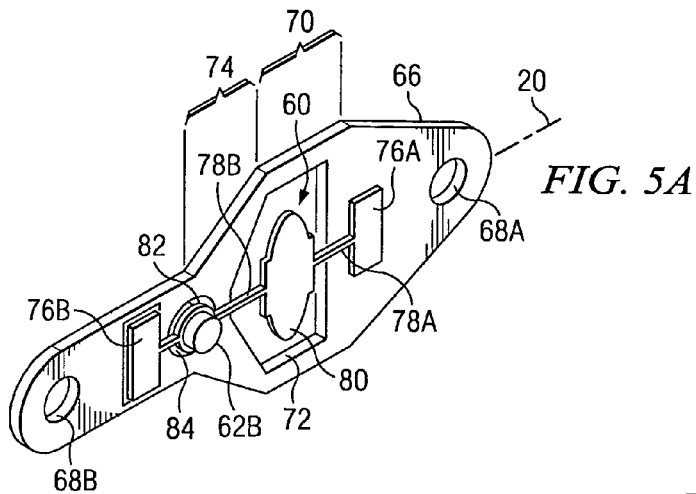
FIGS. 5A and 5B are two perspective views of a torsional hinge device package comprising a full or two torsional hinge mirror including the reflecting or mirror portion, a support structure and a drive mechanism.
Figure 5B:
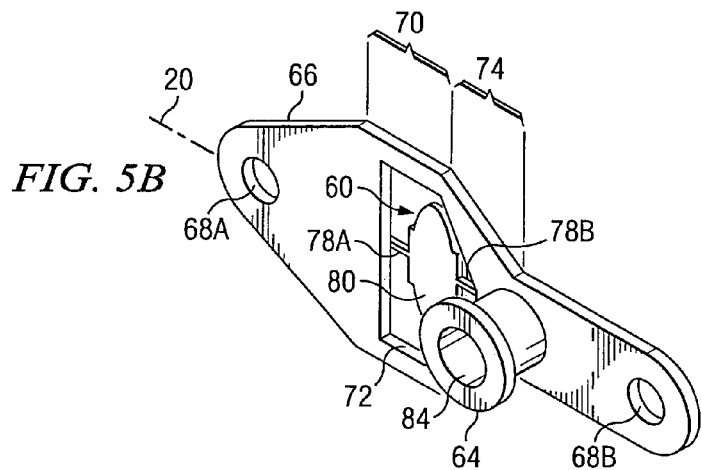

Referring now to FIGS. 5A and 5B, there are shown front and back perspective views of a full hinge (two hinges) torsional device, such as for example a torsional mirror device.

As shown in the figures, there is a support structure 66, a pivoting functional device structure or mirror structure 60 and a drive mechanism comprising permanent magnets 62b and a drive bobbin 64 for receiving windings of an electrical conductor. As was discussed above, permanent magnet 62b may be eliminated and only a single magnet 62a (not shown) on the opposite side of enlarged area 82 may be used. Alternately, both magnets 62a and 62b may be attached on opposite sides of enlarged area 82. As shown, the support structure or mounting bracket 66 includes areas such as mounting apertures 68a and 68b for mounting the complete structure to a using device, a functional area or mirror area 70 defining an aperture 72 that allows the mirror or other device to pivotally rotate or oscillate and the area 74 for providing magnetic forces to pivotally oscillate the functional device or mirror structure 60. As was discussed above with respect to FIGS. 4A and 4B, the mirror structure 60 may be formed from a single piece of silicon or, alternately, the mirror structure 60 may be formed of multiple layers of silicon bonded together. To simplify the drawings, the embodiments of the invention illustrated in FIGS. 5A, 5B, 6A, 6B, 7A, 7B and 8 are all illustrated with a single layer mirror structure 60. However, as will be discussed, each of these embodiments could include a multilayered structure such as illustrated in FIG. 4B.

Therefore, as shown, the torsional device or mirror 68 of FIGS. 5A and 5B includes a pair of anchor pads 76a and 76b, a torsional hinge 78a extending from the functional or mirror surface 80 to an anchor pad 76a and another torsional hinge 78b extending from another anchor pad 76b to the functional surface 80. As shown, torsional hinge 78b is longer than torsional hinge 78a and includes the enlarged magnet attaching area 82. As will be discussed later, the permanent magnets 62a (and/or 62b) preferably have diametrically oriented poles. That is, the poles are perpendicular to the rotational axis, and in a plane parallel to the plane of the functional surface or mirror 80. Alternately, the permanent magnet(s) 62a (and 62b) may have a magnetic polarization oriented perpendicular to the plane of the mirror surface or mirror 80.

To allow room for the permanent magnet 62a and the enlarged area 82 that supports the permanent magnets 62a and 62b to freely rotate, a cavity or aperture 84 is formed in the support structure immediately in line with the drive or bobbin portion. Thus, as will be appreciated by those skilled in the art, when magnetic forces are applied to the magnet(s), the functional surface or mirror surface 80 will be forced to pivot around its torsional hinges 78a and 78b along the pivoting axis 20. It will be appreciated that the extent of rotation of the enlarged area and the magnets will be substantially less than the mirror, and therefore the size of aperture or cavity 84 need not be large enough for full rotation.

Thus, it can be seen that by winding a conductor around the drive bobbin 64, and providing an alternating current through the windings, magnetic forces created by the alternating current will interact with the permanent magnet(s) to cause pivoting of the device.

Figure 6A:
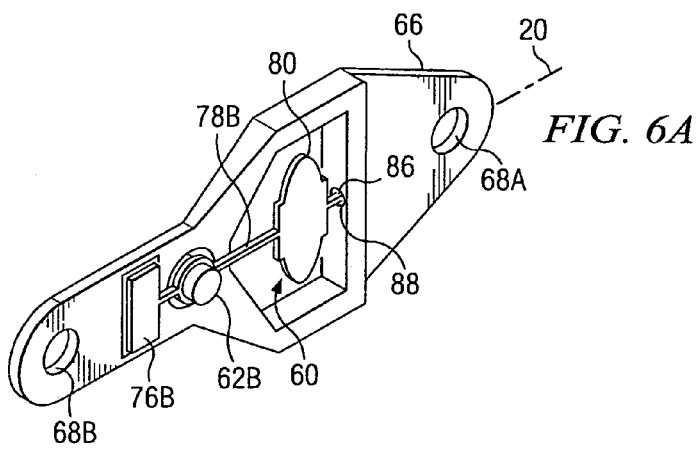
FIGS. 6A and 6B are two perspective views of a torsional hinge device package comprising a half or single torsional hinge mirror including the reflecting portion, such as a mirror, the support structure and the drive mechanism.
Figure 6B:
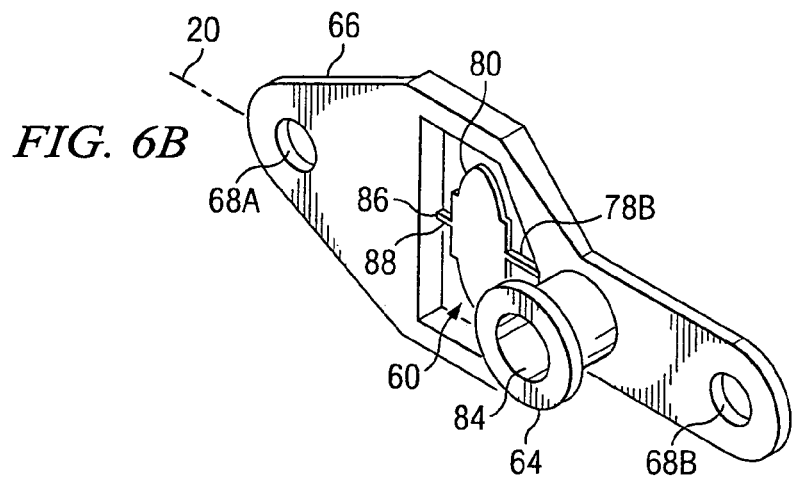

Referring now to FIGS. 6A and 6B, there are shown two perspective views of a half hinge torsional hinged mirror or device. As can be seen, many of the elements of FIGS. 6A and 6B, which are similar to those of FIGS. 5A and 5B carry the same reference numbers.

As shown, the device is substantially similar to that of FIGS. 5A and 5B except that a half or single torsional hinge device, such as discussed in FIGS. 4A and 4B, replaces the full or two torsional hinge device. Thus, according to this embodiment, instead of torsional hinge 78a there is included an axial member 86 extending along the pivoting axis 20 and into an axial support such as the receiving aperture 88 formed or drilled into the support structure 66. The receiving aperture 88 prevents the motion of the mirror in a direction perpendicular to the rotational axis 20 or pivoting axis, but allows the mirror to freely rotate within the aperture 88.

Figure 7A:
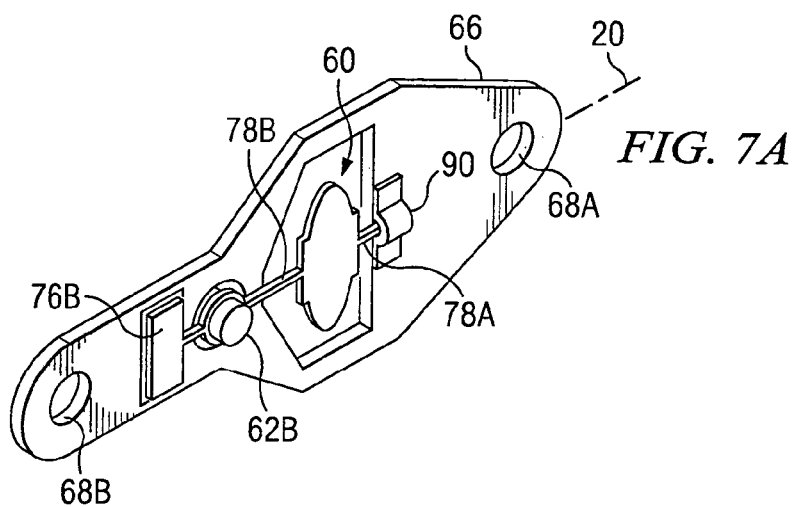
FIGS. 7A and 7B are two perspective views showing a second embodiment of a half hinge torsional device such as shown in FIGS. 6A and 6B with a hub member for axial support.
Figure 7B:
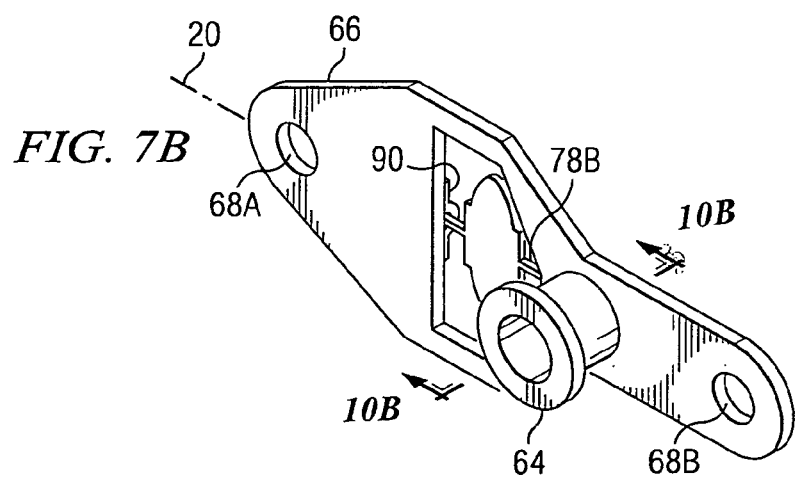

Referring to FIGS. 7A and 7B, there is shown another embodiment similar to that of FIGS. 6A and 6B except that instead of an aperture formed in the support structure, a support hub member 90 is secured to a top surface of the support structure for preventing the motion of the mirror in a plane perpendicular to the rotational or axis 20.

In addition to the full hinge and half hinge mirror and support structures discussed above, there is shown still another embodiment of a two-magnet drive and support structure illustrated in the single top view of FIG. 8. The mirror support structure and drive structure of the drive of FIG. 8 is similar to that of FIGS. 5A and 5B, except the second hinge 78a includes a second enlarged area 82a for mounting another permanent magnet 63 located between the mirror 80 and a second anchor pad 76a. There is also included, of course, another bobbin area with multiple electrical windings (not shown) for interacting with permanent magnet 65 to maintain the mirror at resonant oscillations.

Referring now to FIG. 9, there is shown a cross-sectional view of the drive mechanism illustrated in FIGS. 3B and 3C for driving a mirror such as the mirror of FIG. 2B. Elements of FIG. 9 that are the same as the elements of FIGS. 3B and 3C carry the same reference numbers. Therefore, as shown, the pivoting mirror member or reflecting surface 16 is supported along its pivoting or selected axis 20 by torsional hinges not shown. Thus, the mirror is free to pivot about the selected axis 20 as indicated by arcurate arrows 92a and 92b. Also as shown, the mirror member 16 of mirror device 12 includes a permanent magnet 38 mounted with its north/south pole or axis perpendicular to the surface of the mirror member 16 as indicated by double-headed arrow 94. Also shown are core pieces 96a and 96b, which extend to end points 98a and 98b. A conductor is wound around the core pieces 96a and 96b to provide a multiplicity of windings 100. The conductor or wire is wound around a plastic bobbin 102 and the core pieces, and the two ends of the wire are connected to an alternating power source 104 for providing an alternating current through the windings 100. Thus, it will be appreciated that the core ends 98a and 98b will continually change between a north pole and a south pole. The cores are also wound such that when end point 98a is positive (north), end point 98b is negative (south), and when end point 98b is north, end point 98a is south. Thus, when end point 98a has a south orientation, the north pole 106a of permanent magnet 38 will be attracted to end point 98a while at the same time the north orientation of end point 98b will repel north pole 106a of the permanent magnet and attract south pole 106b. Then, as will be appreciated by those skilled in the art, when end point 98a has a north orientation and end point 98b has a south orientation, the magnet 38 and mirror member 16 will pivot in the opposite direction. Further, as will be appreciated, the mirror member 16 of mirror device 12 will preferably have a resonant frequency about the selected axis 20 and if the alternating current supplied by power source 104 is set to pivot the mirror member 16 at this resonant frequency, the mirror will pivotally oscillate at the resonant frequency with a minimum amount of power being used. Although FIG. 9 illustrates the drive mechanism with respect to a mirror arrangement similar to FIG. 2B, it will be appreciated that the permanent magnet could be mounted on the topside or on both the topside and bottom side of the enlarged area 82 as illustrated in FIGS. 5A and 5B, as discussed above, to drive the mirror 80 in a similar manner.

Referring now to FIG. 10A, there is a view of the enlarged area 82 defined on torsional hinge 78b of mirror device 60. Also shown is a picture of the magnet 62a and/or 62b showing a north pole/south pole orientation that is perpendicular to the pivoting axis 20, or diametrically charged poles.

Now referring to FIG. 10B, there is shown a cross-sectional view of FIG. 7B along line 10b-10b. As was discussed, the enlarged area 82 of the torsional hinge is mounted above the cavity or aperture 84 in the support structure such that the magnet 62a and enlarged area 82 of the mirror device 60 may freely rotate around axis 20 as indicated by arcurate arrow 108. The electrical conductor wound around the drive bobbin 64 of the structure, is wrapped such that when an alternating power supply 104 is connected to the two ends of the wiring creating the windings, the magnetic forces created by the windings will result in a north pole/south pole orientation that is perpendicular to both the surface of the enlarged area and to the pivoting axis 20 of the mirror, as indicated by double-headed arrow 110. Further, the north pole/south pole alternates such that the topside 112a of the windings around bobbin 64 switches between a north and south orientation, as does the bottom side 112b. Thus, as shown in the illustration, when the topside 112a of the coil structure has a north pole orientation, the north pole of the diametrical permanent magnets 62a and/or 62b will be repelled and the south pole of the permanent magnet(s) will be attracted. However, since the north pole and south pole of the permanent magnet(s) are on opposite sides of the axis, as illustrated by double-headed arrow 114, the mirror will rotate under these magnetic forces. When the orientation of the electromagnet is switched by the alternating current, the forces will reverse and the mirror will pivot in the opposite direction. Thus, if the current alternates at the resonant frequency of the mirror, the mirror will resonate and continue to pivotally oscillate with minimal power.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A pivoting mirror package comprising:
   a unitary mirror support structure having a mirror side and a bottom side and defining a mounting portion adapted for attaching said unitary mirror support structure to a using device, a mirror portion for supporting a pivoting mirror device, and a bobbin portion formed on said bottom side;
   a mirror device comprising an anchor for attaching said mirror device to said unitary mirror support structure, a mirror member, and a first torsional hinge extending along a selected axis between said anchor and said mirror member for pivotally supporting said mirror member about said selected axis, said first torsional hinge further defining at least one enlarged area located between said anchor and said mirror member and above said bobbin portion of said support structure;
   at least one permanent magnet attached to said at least one enlarged area collinear with said hinge and said selected axis and defined on said first torsional hinge; and
   at least one coil comprising a multiplicity of electrical windings supported by said bobbin portion such that an electric current through said multiplicity of windings will create a magnetic force that cooperates with said at least one permanent magnet to pivot said mirror member at or near a resonant frequency thereof about said first torsional hinge wherein said permanent magnet that pivots said mirror member about said first axis is located along said first axis.

2. The pivoting mirror package of claim 1 wherein said anchor is a frame and said mirror device includes another torsional hinge extending away from said first torsional hinge and along said selected axis from said mirror member to said frame.

3. The pivoting mirror package of claim 2 wherein said another torsional hinge defines another enlarged area between said mirror member and said another anchor.

4. The pivoting mirror package of claim 3 further comprising another permanent magnet attached to said another enlarged area and another coil for creating a magnetic force that cooperates with said another permanent magnet.

5. The pivoting mirror package of claim 1 wherein said anchor is a first attaching pad and said mirror device includes a second attaching pad and another torsional hinge extending away from said first torsional hinge and along said selected axis from said mirror member to said second attaching pad.

6. The pivoting mirror package of claim 5 wherein said another torsional hinge defines another enlarged area between said mirror member and said another anchor.

7. The pivoting mirror package of claim 6 further comprising another permanent magnet attached to said another enlarged area and another coil for creating a magnetic force that cooperates with said another permanent magnet.

8. The pivoting mirror package of claim 1 wherein said mirror device further comprises an axial member having a first end attached to said mirror member and a free end, said free end extending away from said mirror member along said selected axis, and further comprising an axial support for constraining movement of said axial member in a plane perpendicular to said selected axis while allowing said free end of said axial member to pivot around said selected axis.

9. The pivoting mirror package of claim 8 wherein said axial support comprises an aperture defined in said unitary mirror support, said aperture for receiving said free end of said axial member.

10. The pivoting mirror package of claim 8 wherein said axial support comprises a hub member secured to the mirror side of said unitary mirror support structure, said hub member defining a recess for receiving said free end of said axial member.

11. The pivoting mirror package of claim 1 wherein said mirror device is formed from single crystalline silicon.

12. The pivoting mirror package of claim 1 wherein said mirror device is formed of multilayers comprising at least a hinge layer having a mirror side and a backside formed from single crystalline silicon and a mirror layer attached to said mirror side of said hinge layer.

13. The pivoting mirror package of claim 12 further comprising a balancing layer bonded to said backside of said hinge layer and wherein the thickness and mass of said balancing layer is selected such that the mass of said mirror layer, said hinge layer, said balancing layer and said permanent magnet represents a total mass moment substantially located on said selected axis.

14. The pivoting mirror package of claim 1 wherein said permanent magnet has diametrically charged poles.

15. The pivoting mirror package of claim 1 wherein said permanent magnet has axial charged poles.

16. The pivoting mirror package of claim 1 wherein said unitary mirror support structure is made of plastic.

17. The pivoting mirror package of claim 1 wherein said bobbin portion of said unitary support structure further defines a cavity on said mirror side and below said enlarged area of said torsional hinge to allow rotation of said enlarged area and said attached permanent magnet.

18. The pivoting mirror package of claim 17 wherein said cavity is an aperture through said unitary support structure.

19. The pivoting mirror package of claim 1 wherein said at least one enlarged area has a mirror side and a backside and said permanent magnet is attached to said backside.

20. The pivoting mirror package of claim 1 wherein said at least one enlarged area has a mirror side and a backside and said permanent magnet is attached to said mirror side.

21. The pivoting mirror package of claim 20 further comprising a second permanent magnet attached to said backside.

22. A method of packaging and driving a torsional hinge mirror comprising the steps of:
   providing a unitary mirror support structure having a mirror side and a bottom side and defining a mounting portion adapted for attaching a mirror portion, and a bobbin portion formed on said bottom side;
   attaching said unitary support frame to a using device;
   pivotally supporting a torsional hinged mirror member having an enlarged area on said torsional hinge for pivoting about a selected axis said enlarged area, said torsional hinge and said selected axis being collinear;
   attaching said torsional hinge of said mirror device to said unitary support structure;
   attaching a permanent magnet to said enlarged area defined on said torsional hinge;

forming a multiplicity of electric windings on said bobbin portion;

applying an electric current to said multiplicity of windings to generate a magnetic force that cooperates with said permanent magnet; and pivoting said mirror device around said selected axis at or near resonant frequency thereof with said magnetic force wherein said permanent magnet that pivots said mirror member about said selected axis is located along said selected axis.

23. The method of claim 22 wherein said mirror member is pivotally supported by a pair of torsional hinges attached to said unitary support structure.

24. The method of claim 22 wherein said mirror member includes a single torsional hinge and is further supported by an axial member having a free end extending away from said mirror member along said selected axis and an axial support for constraining movement of said axial member in a plane perpendicular to said selected axis while allowing said free end to pivot.

25. The method of claim 23 wherein each hinge of said pair of hinges defines an enlarged area, said step of attaching a permanent magnet comprises the step of attaching at least one permanent magnet to the enlarged areas on each hinge of said pair of hinges and forming a multiplicity of windings comprises forming a first multiplicity of windings and a second multiplicity of windings.

* * * * *